H. B. MORRILL.
VALVE CLOSING MECHANISM.
APPLICATION FILED APR. 2, 1909.

994,948.

Patented June 13, 1911.
2 SHEETS—SHEET 1.

WITNESSES
William B. Cox.
Edith S. Davis.

INVENTOR
Herbert B. Morrill

H. B. MORRILL.
VALVE CLOSING MECHANISM.
APPLICATION FILED APR. 2, 1909.
994,948.
Patented June 13, 1911.
2 SHEETS—SHEET 2.
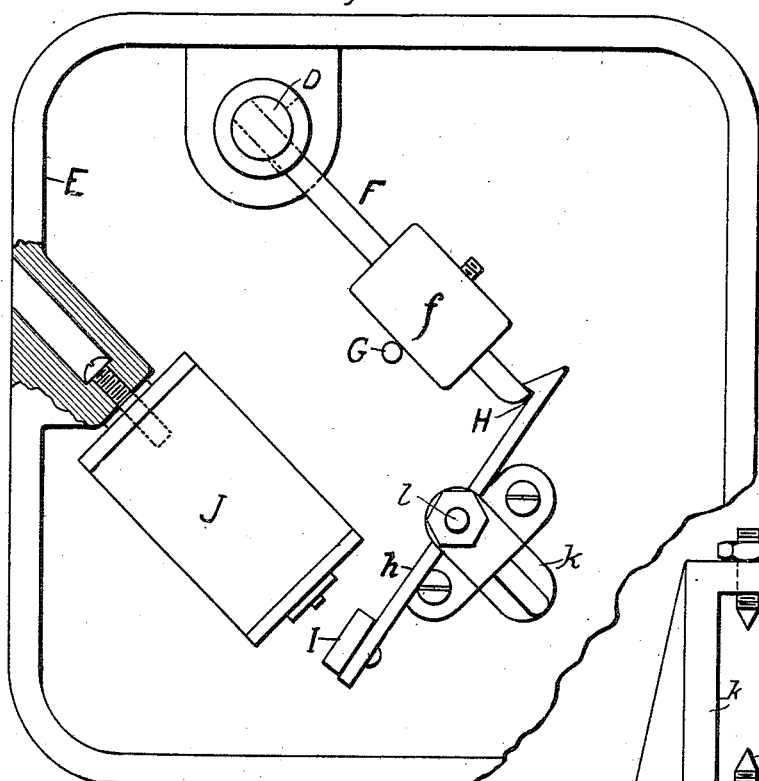
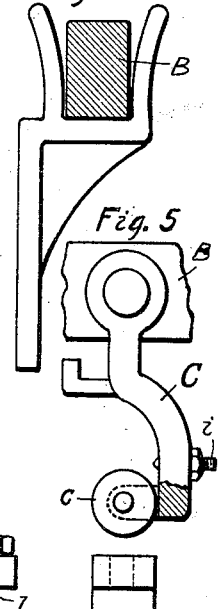
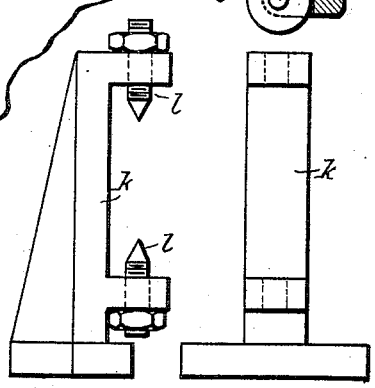
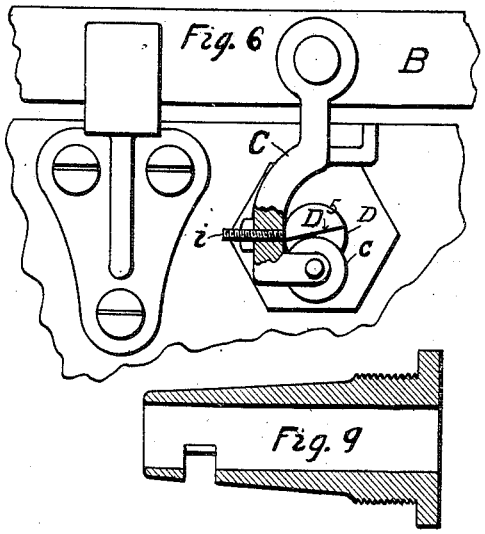
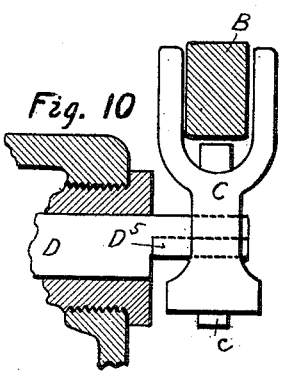
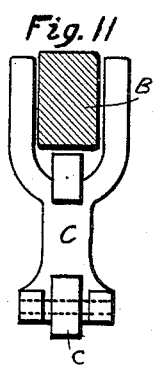
WITNESSES
William B. Cox.
Edith S. Davis.
INVENTOR
Herbert B. Morrill

UNITED STATES PATENT OFFICE.

HERBERT B. MORRILL, OF SALEM, MASSACHUSETTS.

VALVE-CLOSING MECHANISM.

994,948.  Specification of Letters Patent.  Patented June 13, 1911.

Application filed April 2, 1909. Serial No. 487,480.

*To all whom it may concern:*

Be it known that I, HERBERT B. MORRILL, of Salem, in the county of Essex and State of Massachusetts, have invented certain new and useful Improvements in Valve-Closing Mechanism, of which the following is a specification.

This invention relates to valve closing mechanism and more particularly to electrically operated mechanism for closing the main or throttle valve of a piping system at a distance from said valve, thereby controlling the flow of vapor or fluid.

Figure 1:
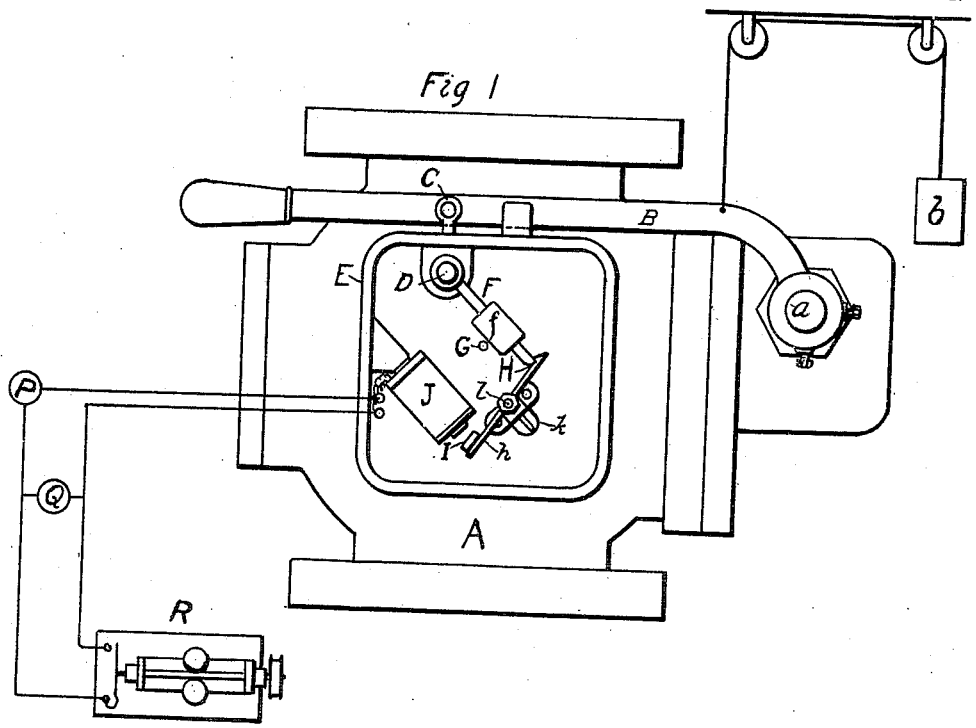
Figure 2:
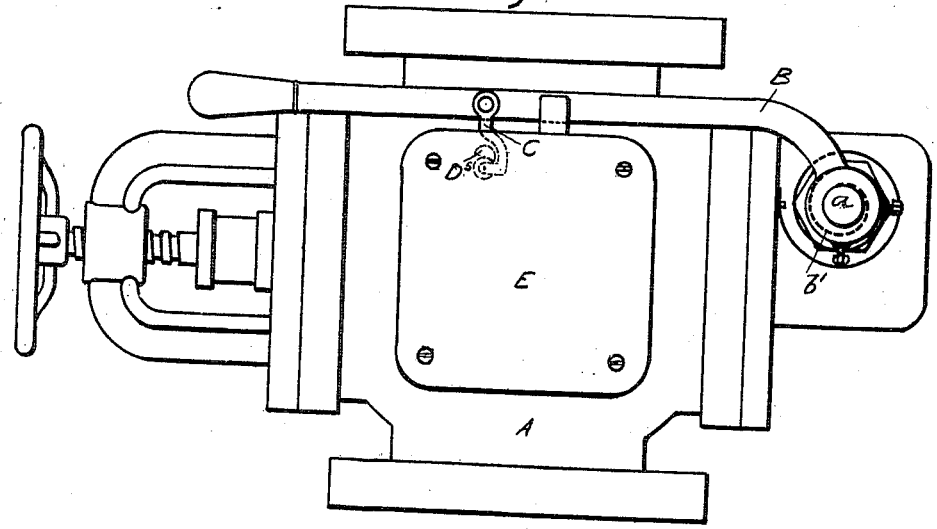

Referring to the drawings illustrating an embodiment of my invention,—Figure 1 is a side elevation of a valve having the cover of the box containing the releasing mechanism forming a part of my invention, removed; Fig. 2 is a similar view of a valve embodying my invention and provided with hand operated valve controlling mechanism; Fig. 3 is a plan view upon an enlarged scale of the releasing device shown in Fig. 1; Fig. 4 is a side view of a lever guide bracket; Fig. 5 is a side view of a detent; Fig. 6 is a side view of the bracket shown in Fig. 4, the detent shown in Fig. 5 and an end view of the retainer shaft; Figs. 7 and 8 are details of the part $k$ shown in Figs. 1 and 3; Fig. 9 is a sectional view of a bearing for the retainer shaft; Fig. 10 shows partly in section and partly in elevation the detent and retainer shaft shown in Fig. 6 and the bearing shown in Fig. 9; and Fig. 11 shows a front elevation of the detent shown in Figs. 5, 6 and 10.

Referring to Fig. 1, A is a valve casing containing a valve (not shown) which may be of the usual construction, and either single or double seated. A lever B is secured to the valve moving shaft $a$ in such manner that an upward movement thereof will close the valve, and said lever is normally strained toward valve closure position by a weight $b$ (Fig. 1) or a spring $b'$ (Fig. 2) affixed to the valve casing and lever, or in any other suitable manner. To the lever B is pivoted a detent C which, in the embodiment of my invention illustrated in the drawings, consists of a hook or latch provided at its lower or hooked end with an antifriction roller $c$.

Upon the valve casing A is secured a box or casing E provided with bearings (Fig. 3) in which is journaled a rotatable retainer shaft D having an eccentric surface or retainer $D^5$ against which the roller $c$ of the detent bears. The bearing point of the antifriction roller $c$ upon the eccentric surface of the retainer shaft D, is close to but at one side of the center of rotation of said retainer shaft and a screw $i$ (Fig. 6) carried by the detent C prevents said roller $c$ from engagement beyond said bearing point. The retainer shaft D is normally held with its eccentric surface nearly horizontal by a radial lever F provided with a weight $f$. A stop G serves to limit the downward movement of said lever F. In order normally to hold the retainer shaft D against rotation in response to the upward strain upon the detent C, there is provided a lever $h$ having a latch H normally engaging with the lower end of the radial lever F. The lever $h$ is preferably journaled in a bracket K on center screws $l$ as shown in Fig. 7, and carries at or near one end an armature I.

J is an electromagnet affixed to the casing E and having its poles in attractive distance from the armature I, and its terminals in connection with a suitable source of electric power as indicated at P (Fig. 1).

Suitable current controlling devices such as buttons, switches, etc., indicated at Q, are provided and a speed controlling governor R (Fig. 1) may be employed.

As shown in Fig. 2 it is desirable although not essential to combine my improved valve closing mechanism and the valve operated thereby, with an independent hand operated valve of the usual and well known construction.

In operation, upon the energizing of the electro-magnet J the armature I is attracted thereto causing the lever $h$ to move thus releasing the latch H leaving the retainer shaft D free to rotate. The antifriction roller $c$ in response to the upward strain exerted upon it, immediately rotates the retainer shaft sufficient to permit it to slip free from the retainer $D^5$ thus permitting the lever B to spring up and close the valve. It will be seen that both the retainer shaft D and the detent C are angularly movable so that a quick releasing action is insured. It will be clear that the clutching means provided by the detent C and retainer shaft D with its eccentric surface, is very sensitive and at the same time positive and reliable; and that the same upward strain which normally holds the antifriction roller $c$ firmly in engagement with the eccentric surface of the retainer shaft D, and prevents it from slipping therefrom, serves to release the detent and close the valve. As soon as the detent slips free, the lever F drops causing the retainer shaft D to return to its normal position with its eccentric surface nearly horizontal in readiness to reëngage the detent C with a positive locking action when the latter is again depressed.

What I claim and desire to secure by Letters Patent is:

1. The combination of a valve, valve closing mechanism and means to strain it toward valve closure position, a swinging hooked latch carried by the valve closing mechanism, a retainer shaft mounted to rock upon its bearings and having an eccentric surface against which and close to the center of rotation of said shaft said latch bears, both the retainer and detent being angularly movable, a catch normally holding the retainer shaft against movement in response to pressure from said latch, and means to release said catch from said retainer shaft.

2. The combination of a valve, valve closing mechanism and means to strain it toward valve closure position, a swinging hooked latch carried by the valve closing mechanism and provided with an antifriction roller, a retainer shaft mounted to rock upon its bearings and having an eccentric surface against which and close to the center of rotation of said shaft said antifriction roller bears, both the retainer and detent being angularly movable, a catch normally holding the retainer shaft against movement in response to pressure from said latch, and means to release said catch from said retainer shaft.

3. The combination of a valve, valve closing mechanism and means to strain it toward valve closure position, a swinging hooked latch carried by the valve closing mechanism and provided with an antifriction roller, a retainer shaft mounted to rock upon its bearings and having an eccentric surface against which and close to the center of rotation of said shaft said antifriction roller bears, both the retainer and detent being angularly movable, a stop to prevent said antifriction roller from engaging said retainer shaft at a point beyond its center of rotation, a catch normally holding the retainer shaft against movement in response to pressure from said latch, and means to release said catch from said retainer shaft.

4. The combination of a valve, valve closing mechanism and means to strain it toward valve closure position, a swinging hooked latch carried by the valve closing mechanism and provided with an antifriction roller, a retainer shaft mounted to rock upon its bearings and having an eccentric surface against which and close to the center of rotation of said shaft said antifriction roller bears, a radial lever carried by said retainer shaft, a lever having at one end a latch adapted normally to engage said radial lever and an armature at its opposite end, and an electromagnet to actuate said armature to release said latch.

In testimony whereof I have affixed my signature, in presence of two witnesses.

HERBERT B. MORRILL.

Witnesses:
Wm. D. Chapple,
Madaline M. Briggs.

---

Copies of this patent may be obtained for five cents each, by addressing the "Commissioner of Patents, Washington, D. C."